United States Patent Office 2,788,323
Patented Apr. 9, 1957

2,788,323
DRILLING FLUID COMPOSITIONS FOR POROUS FORMATIONS

Arie Brakel, Maracaibo, Venezuela, and Norman Healey, St. Albans, England, assignors to Shell Development Company, New York, N. Y., a corporation of Delaware No Drawing. Application September 29, 1954, Serial No. 457,280

Claims priority, application Netherlands September 24, 1953

4 Claims. (Cl. 252—8.5)

This invention pertains to the drilling of oil wells, and relates more particularly to a method and composition for preventing or minimizing loss of drilling fluid from a well borehole into permeable or porous formations and fissured or fractured formations.

An essential feature in the rotary drilling of oil wells is the use of a drilling fluid or mud, consisting of a suspension in a suitable liquid, such as oil or water, of material such as clay or calcium carbonate, sometimes weighted down with additional comminuted heavy materials, such as barytes, galena, red lead, crushed oyster shells, etc.

The functions of the drilling fluids are to lubricate the bit, to carry the cuttings up to the surface, to furnish a static head of liquid which overbalances formation fluid pressures, and to form on any permeable walls of the borehole a sheath capable of preventing or minimizing the penetration of the drilling fluid into the formation, and its loss therein.

In many cases, the amounts of the drilling fluid lost from the borehole to the formation depend less on the plastering properties of the drilling mud than on the structural characteristics of the strata traversed by the well. Thus, in formations having fissures, cavities or crevices, and especially in low pressure, coarse-grained permeable porous formations, the solid particles ordinarily present in the drilling mud easily pass through the interstices between adjacent grains of sand or gravel without exerting any plugging action, with the result that large volumes of the expensive drilling mud are carried into the formations and lost. This loss of circulation of the mud may, in turn, lead to the freezing of the drill string, the collapse of the walls of the borehole, or other undesirable consequences.

When such formations are being drilled through, an attempt is usually made to prevent or minimize the loss of the drilling mud by adding various materials such as cottonseed hulls, mica flakes, sawdust, Celluloid, or cellophane flakes, asbestos fibers, ground rubber or guttapercha, etc., to the mud, and by circulating this material-laden mud down the borehole until the particles of material plug or bridge the cavities or the pores of the formation and prevent any further loss of drilling mud. However, even the most effective plugging materials that have been suggested for use in drilling muds for preventing loss of circulation possess one or more of the following undesirable properties:

(1) The majority of the present plugging materials can only be added to a drilling mud in small concentrations without increasing the viscosity of the mud to such a degree that it can no longer be circulated in the borehole with normal pump pressures.

(2) The original size of particles of some materials that have been suggested is so small that inadequate bridging action is furnished by these particles in all but the relatively smallest pores or cavities.

(3) These particles show a strong tendency to settle out.

(4) The physical and chemical properties of many materials are unfavorably affected by mineral oil products which tend partially or completely to disintegrate said materials. Materials that are thus affected by oil cannot be used effectively in oil-base muds, in oil-base emulsions, in water-base emulsions, or in any drilling mud where they may come in contact with oil from the producing zone of the well.

(5) Many of the materials suggested may cause permanent damage to the productivity of the well, for example, when said materials are used in drilling through oil or gas-bearing layers or formations (particularly when these layers are highly porous and/or show fissures) which first have to be shut off and subsequently brought into production at a later stage in the drilling operations. Permanent damage to these oil or gas producing formations is encountered since the solid plugging materials mentioned can only be removed with difficulty if at all.

It is therefore a primary object of this invention to provide a porous light-weight solid material which may be ground or crushed to any predetermined size and then added to and circulated in a drilling fluid for plugging porous formations traversed by well.

Another object of this invention is to provide porous light-weight solid particles of predetermined size which are substantially acid soluble and water insoluble, and which rapidly disintegrate when treated with certain weak acid solutions.

Another object of this invention is to provide an improved method for minimizing or preventing the loss of the drilling mud to the formation and for correcting the loss of circulation in a well borehole.

Another object of this invention is to provide a porous material for drilling muds which meets the requirements of an all-purpose additive to prevent loss from the fluid to surrounding formations while at the same time being readily disintegratable when it is desired to remove said material from a well.

A further object of the present invention is to provide drilling fluid additives for sealing a well borehole which are light in weight and do not readily separate out of the drilling fluid nor interfere with the pumping of the drilling fluid.

Another object of this invention is to provide a sheath-forming plugging material adapted to be added to drilling fluids to seal porous formations, which material will not chemically affect the drilling fluid.

These and other objects of this invention will be understood from the following description of the invention.

Broadly, the material of the present invention comprises a lightweight porous solid substance which is capable of being disintegrated in an acid, such as hydrochloric acid, and preferably even in a dilute hydrochloric acid solution. Excellent results were obtained in correcting for the loss of drilling fluid into a porous formation of a well borehole by admixing with the drilling fluid quantities of a granulated expanded carbonate, particularly calcium carbonate, for example expanded limestone. The resultant mixture of drilling fluid and particles of porous or expanded limestone is pumped through the well bore to contact the lost circulation zone thereof where the larger particles of expanded limestone form a bridge over the interstices or fissures in the formation while the finer particles of limestone or clay in the drilling mud seal any interstices which may exist between the large particles of limestone. In this manner a fluid-impervious barrier is formed to prevent the passage of drilling fluid from the borehole into the surrounding formations.

Porous solid particles used in accordance with the present invention have a relatively low apparent specific gravity and hence a large quantity thereof can be used, even in lightweight drilling fluids, without their settling out to any substantial degree. Thus, with sufficient quantities of this porous lightweight material added to the drilling fluid, porous sections and fissures in the formation can be effectively sealed.

The size of the particles of expanded limestone to be used in drilling and plugging a porous formation depends upon various factors. At least a portion of the material added should be relatively coarse, for example, from ⅛ to ⅜ of an inch or more for a maximum diameter so as to seal the larger fissures in the formation, while the finer material is used to seal effectively any openings that may exist between the coarse particles. As an illustration, for sealing a certain coarse formation, the particles of expanded limestone to be added are of a size so that at least 20% by weight of the material remained on the number 10 A. S. T. M. sieve while at least another 10 to 20% remained on a number 20 A. S. T. M. sieve. With the porous particles, which are added to drilling fluids in accordance with the present invention, there is an appreciable difference between the true and apparent specific gravities of the particles. The porosity of the particles is preferably more than 30%.

After the well has been completed, or during well completion operations, it may be desirable to remove the expanded limestone sheath from a particular section of the formation (usually a limestone or sandstone formation) and bring that section of formation into production. While this would be impossible to do when using the presently known solid plugging materials, the expanded limestone sheath formed in accordance with the present invention may be completely removed in a very short time by pumping or spotting a suitable volume of acid, for example, a 15% solution of hydrochloric acid (preferably inhibited) adjacent the porous limestone sheath. The sheath rapidly disintegrates and can be circulated out of the well with the drilling fluid.

A suitable process for preparing a porous solid substance which disintegrates in acid and which even dissolves to a large extent in the dilute acid, in accordance with the present invention, comprises admixing a predominant quantity of a preferably crushed carbonate, particularly calcium carbonate, for example, limestone, with a minor quantity of sodium silicate, preferably in the form of water glass and subsequently heating the mixture. Preferably, a water glass solution is used which has a density of at least 1.6 so as to yield an expanded product of suitable hardness.

In the process by which limestone is expanded, the quantity of water glass is so chosen so that the ratio of the limestone weight (measured in kilograms) to the water glass volume (measured in liters) lies between 1 and 3. The more water glass that is used, the smaller the pores of the expanded product become, while the pore size distribution is more uniform. A suitable expanded product is obtained by heating the above mixture to a temperature ranging from 400° C. to 800° C. Normally, a temperature of about 500° C. is sufficient.

The porosity of the expanded limestone, prepared in accordance with this invention, may vary from 30% to 70% or more. This value may further be increased by adding to the mixture of the material to be expanded and to the sodium silicate, surface-active substances such as "Teepol" (salts of secondary sulfuric acid alkyl esters).

Another method of preparing the expanded carbonate of the present invention comprises taking a starting material containing mixed crystals of calcium carbonate and magnesium carbonate, for example, dolomite, and heating this material, preferably in the presence of $CO_2$, to a temperature which is above the decomposition temperature of magnesium carbonate, but below the decomposition temperature of calcium carbonate. The resultant product exhibits so-called open porosity. However, it is also possible to prepare an expanded product having closed porosity by taking the above product exhibiting open porosity and treating it with sodium silicate, for example, soaking it in a water glass solution. The mixture is then heated under the conditions indicated previously for the expanding of limestone with sodium silicate. A porous solid substance exhibiting closed porosity is obtained, after crushing, which disintegrates in contact with a 15% hydrochloric acid solution. Closed porosity may also be obtained by treating the crushed porous material of the present invention with suitable plastic materials or natural or synthetic resins which tend to coat the outside of the porous material to close the pores without filling them.

*Example I*

A quantity of limestone was grounded and passed through an A. S. T. M. sieve No. 70. 25 grams of the limestone particles which had passed the sieve were mixed with 10 cubic centimeters of water glass (specific gravity 1.6) to form a slurry which was subsequently heated for three minutes at 500° C. in an oven. The thickness of the slurry layer was about 5 millimeters. After heating, the material formed a hard porous cake and its thickness was found to have doubled. This cake was crushed and was found to consist of a very porous material. The true specific gravity of the expanded material was 2.5 which indicated that the product had practically only open porosity. The apparent specific gravity was slightly higher than one. The porosity was approximately 65%.

The material underwent no change in boiling water. When treated with a 15% hydrochloric acid solution, the material completely disintegrated and about 80% of it dissolved.

*Example II*

The crushed product obtained by the method described in Example I was added to a clay containing drilling fluid. The size of the particles of the crushed porous material was such that 16% by weight was retained on an A. S. T. M. sieve No. 6, 24% by weight on sieve No. 10, 28% by weight on sieve No. 20, with the remainder passing through sieve No. 20. An artificial fissure was then duplicated in a Baroid filter apparatus. This fissure could be plugged off with drilling fluid containing minor amounts of the porous material of the present invention, at a pressure of 7 kilograms per square centimeter (approximately 100 pounds per square inch). Upon acidization the fissure was readily reopened.

*Example III*

Several larger lots of expanded limestone were made by the following procedure. The base materials, water glass and ground chalk, were kneaded to a plastic mass. This material was then heated on a metal plate in an electric furnace to a clinker, which after grinding yielded a product with the properties required for the purpose in view.

The thickness of the paste layer heated on the plate varied in the different tests from ½ to 6 centimeters and the time of heating necessary for each thickness was determined at a given temperature. The paste had to be heated for a longer period or at a higher temperature, the thicker the layer, in order to obtain a product with satisfactory hardness. Experiments have shown that a suitable product can be obtained by heating, for example, a layer 4 centimeters thick for 30 minutes at 550 to 800° C. A product of suitable hardness was obtained on most of the production runs which had a bulk density of between 0.87 to 1.00, a grain density of 2.61 to 2.66 and a porosity of from 44 to 54%. The materials average slightly less than a 80% solubility in a 15% hydrochloric acid solution and a 3% solubility in water.

We claim as our invention:

1. In the drilling of oil wells, the method of overcoming loss of circulation comprising the steps of adding small particles of a lightweight expanded calcium carbonate to the drilling fluid, circulating the resultant composition in the well in contact with the face of the porous formation, and causing said composition to form a substantially fluid-impervious sheath on the face of said formation.

2. A drilling fluid composition for forming a mud sheath over the face of a porous and permeable formation traversed by a well comprising a drilling fluid having added thereto a quantity of small particles of a lightweight expanded limestone said particles being of a size so that at least 20% would be caught on a No. 10 A. S. T. M. screened sieve.

3. The method of preventing drilling fluid loss into well boreholes which comprises introducing into the borehole a quantity of small particles of an expanded calcium carbonate that is substantially acid soluble and water insoluble.

4. A process for correcting lost circulation during the drilling of a well, comprising admixing with the drilling fluid a quantity of particles of expanded limestone in an amount sufficient to plug a porous formation while maintaining a pumpable drilling fluid, and pumping the resultant mixture into the well borehole to contact the lost circulation zone in said borehole.

References Cited in the file of this patent

UNITED STATES PATENTS

| | | |
|---|---|---|
| 1,041,565 | Arthur | Oct. 15, 1912 |
| 2,124,495 | Miller | July 19, 1938 |
| 2,198,563 | Robinson | Apr. 23, 1940 |
| 2,265,773 | Larkin | Dec. 9, 1941 |
| 2,456,207 | McCoy | Dec. 14, 1948 |
| 2,561,075 | Sidwell | July 17, 1951 |
| 2,648,522 | Armentrout | Aug. 11, 1953 |
| 2,650,195 | Cardwell et al. | Aug. 25, 1953 |
| 2,683,690 | Armentrout | July 13, 1954 |
| 2,691,629 | Stoner | Oct. 12, 1954 |